Patented Mar. 11, 1924.

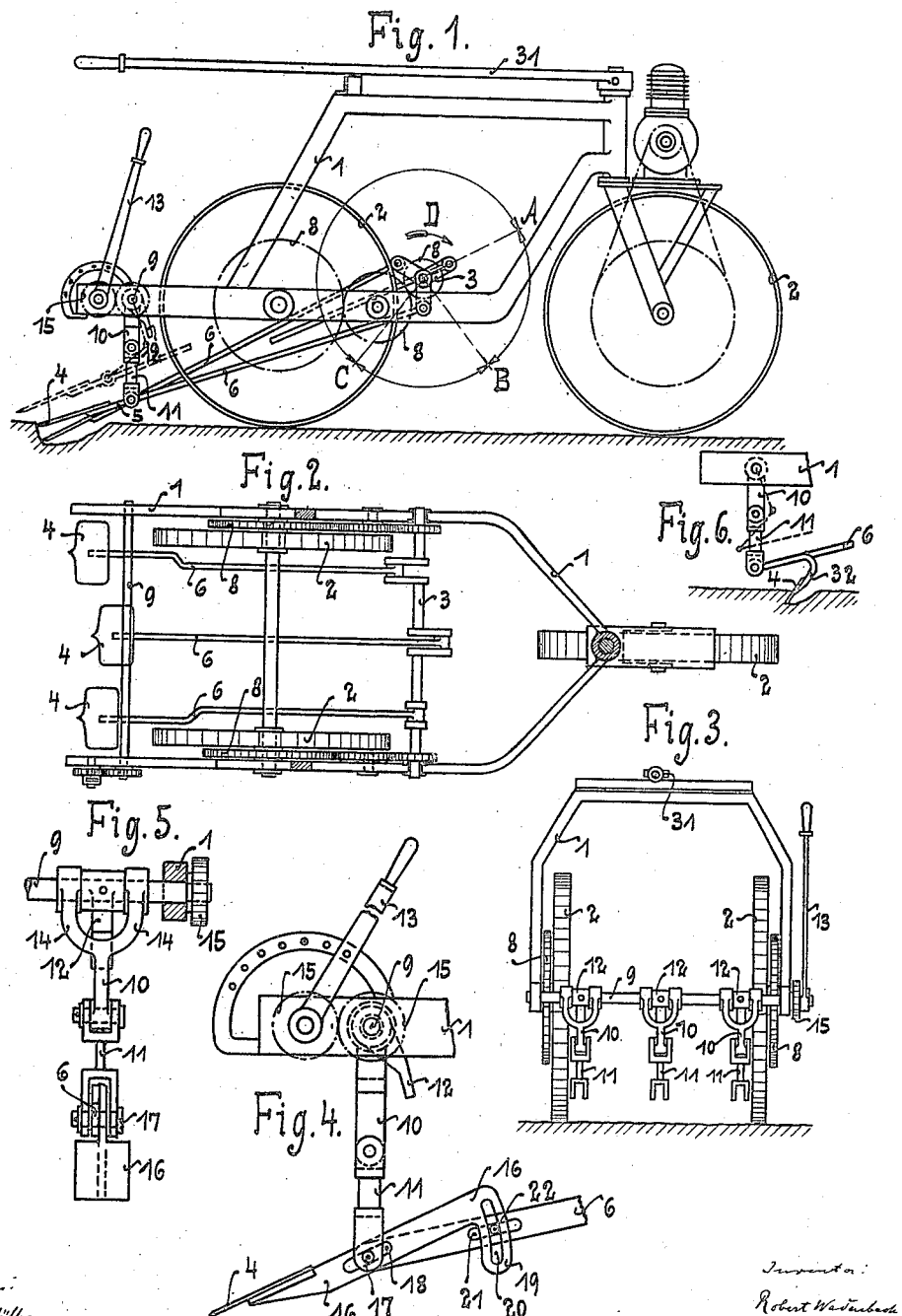

1,486,504

UNITED STATES PATENT OFFICE.

ROBERT WADENBACH, OF MAGDEBURG, GERMANY.

HOEING MACHINE.

Application filed May 6, 1922. Serial No. 559,098.

*To all whom it may concern:*

Be it known that I, ROBERT WADENBACH, a citizen of the German Republic, residing at Magdeburg, Germany, have invented certain new and useful Improvements in Hoeing Machines, of which the following is a specification.

This invention relates to improvements of hoeing machines of that type in which a reciprocating movement is communicated to the hoes or cutting blades by means of a crank shaft, eccentric shaft or the like. The work done with machines of this type of known construction is not always perfect as the ground is merely lifted or moved forward without being sufficiently loosened and crumbled. The roots of the weeds are therefore not brought on top and cannot dry up. The hoeing knives are often mounted upon levers which are rigidly guided and mounted in groups by frames. It has further been proposed to fix the hoeing knives at the ends of the driven connecting rods and to suspend these connecting rods by means of rigid arms on the vehicle so that they can oscillate and cut into the ground from the rear forward. As in the hoeing machines of known construction the movements of the hoeing knives are determined by positive guiding means the hoes can adapt themselves not at all or only very little to the irregularities of the ground so that the hollows in the ground remain untouched by the tools while elevated parts of the ground are raked up and shoved up in heaps.

According to this invention these inconveniences are avoided by the use of a suspension composed of several members. The suspension elements are freely movable in the direction of travel but deviations in lateral direction are prevented by the special construction of the upper suspension members. Owing to their natural weight the hoes are pushed into the ground by shock. The movement of the hoes is made similar to shovelling owing to the rotation of the crank shaft and the soil is consequently crumbled thoroughly. If the hoeing tools are moved forward the suspension members are bent double and slide over the ground. The suspension bends also if the hoes strike against obstacles so that the tools can give way and breaking of the tools is avoided.

A further improvement is that the hoes are mounted upon adjustable shoes so that they can be adjusted to any desired cutting angle. The knife shoes permit also to adjust the position of the knives if the cutting edges are worn. If the cutting angle is adjusted conveniently the hoeing tools penetrate into the ground to a determined depth, this depth being further regulated by adjustment of the upper suspension members. Every cut undercuts the preceding cut for about one third so that no part of the ground remains unplowed.

In order that the invention may be clearly understood, I shall proceed to describe the same with reference to the form of construction shown, by way of example, on the accompanying drawings, wherein:—

Fig. 1 shows a side elevation of the machine.

Fig. 2 is a plan view of the same.

Fig. 3 is a rear elevation.

Fig. 4 shows the suspension of the connecting rods in side elevation.

Fig. 5 is a rear view of Fig. 4.

Fig. 6 shows how the hoe-shaped tools are mounted at the ends of the connecting rods.

The machine consists essentially of the frame 1 with wheels 2. The front wheel serves for steering the machine. The crank shaft 3 is arranged transversely to the direction of travel. The number of crank arms and their mutual position depend on the number of hoeing tools 4. These hoeing tools 4 are mounted at the ends of connecting rods 6. The connecting rods 6 are driven from the crank shaft 3 revolving in the direction of the arrow D, the crank shaft being driven by toothed wheels 8 or other convenient transmission from one rear wheel 2 or from both rear wheels of the machine.

The ends 5 of the connecting rods 6 are suspended by joints consisting of two or more members (Figs. 4 and 5) upon a shaft 9 journaled in frame 1. The suspension is freely movable in the direction of travel but deviations in lateral direction are prevented. With this latter object in view the upper suspension members 10 have curved lateral arms 14 and they are secured against lateral displacement by fingers 12 fixed upon shaft 9. These fingers 12 do not impede the free movement of the members 10 but grip merely under the members 10 if the hoeing tools are being lifted or if they are to be adjusted for a lesser hoeing depth than usual. The revolving of shaft 9 is controlled by the adjustable hand lever 13. Between shaft 9 and hand lever 13 a pair of toothed wheels 15 is inserted to produce the desired direction of movement. This lever 13 can be locked in its position in any convenient manner.

When the machine is working the hoeing tools are pushed into the ground by the part revolution of crank shaft 3 (Fig. 1) from A to B, whereupon from B—C they execute a horizontal almost straight movement in backward direction which is rendered similar to the throw of a shovel by the revolving speed and revolving motion of the crank shaft 3. From C to A the hoeing tools are again advanced for the new working stroke. The articulated suspension of the ends 5 of the connecting rods slides at this part of the cycle over the unplowed ground in the position indicated in Fig. 1 in dotted lines.

If the hand lever 13 is pulled back the fingers 12 grip under the members 10 so that the hoeing tools are lifted out of the ground. By means of a lever system connected with hand lever 13 (not shown on the drawings) the coupling of the drive can be thrown out of gear if the hoeing tools are in the lifted position and the machine is stopped. For lowering the hoeing tools the hand lever 13 is moved in opposite direction. The depth of hoeing depends on the position of the fingers 12. With little hoeing depth these fingers 12 limit the downward movement of the suspension and consequently of the hoeing knives without however impeding otherwise the free movement of these parts.

The hoeing tools are preferably mounted on shoes 16 which are pivotally mounted together with the ends 5 of the connecting rods upon bolts 17 fixed in the fork-shaped ends of the members 11 of the articulations. The shoes 16 have slits 18 and they can be advanced or withdrawn for regulating the depth of hoeing and for readjusting the worn off hoeing tools. The ends 19 of the shanks of the shoes are enlarged or preferably bent at an angle and they have slits 20. Slits 21 are further provided in the connecting rods 6 and screw bolts are adjustable in these slits. The slits 20 permit to regulate the cutting angle of the hoeing tools 4.

If the hoeing tools 4 strike against obstacles the articulations 10 and 11 yield so so that breaking of the machine is prevented.

The machine can be pulled by human force, by draught animals or by motor power.

The steering is effected with the aid of lever 31.

As the hoeing tools, if working, exert a pushing action upon the vehicle comparatively little power is required. The driving wheels can evidently be mounted each for itself or they can be connected one with the other by a differential gear. The hoeing tools are interchangeable. The shape of the hoeing tools depends on the conditions of the ground and of the work to be done.

The machine can be fitted with any required number of hoeing tools. If narrowly furrowed fields have to be plowed with the machine the ends 5 of the connecting rods are made fork-shaped and narrow knives are arranged at these ends in accordance with the width of furrow. The hoeing tools can also be mounted upon the connecting rod 6 by means of curved shanks 32 (Fig. 5) so that the tools are similar to a hand hoe and work exactly like this garden tool.

I claim:—

1. A hoeing machine in which a reciprocating movement is communicated to the hoeing knives from a crank shaft, eccentric shaft or the like, comprising in combination with the crank shaft, means for driving said crank shaft from the running wheels of the machine, hoeing tools, connecting rods one for each tool connecting said tool with the crank shaft, a shaft mounted in the machine frame, articulations composed of two or more articulated members for suspending the ends of the connecting rods to said shaft, and means for preventing the lateral displacement of said articulations.

2. An improved hoeing machine as described and shown comprising in combination with the crank shaft, means for driving said crank shaft from the running wheels of the machine, hoeing tools, connecting rods one for each tool connecting said tool with the crank shaft, a shaft mounted in the machine frame, articulations composed of two or more articulated members for suspending the ends of the connecting rods to said shaft, downwardly projecting fingers fixed upon said shaft and gripping under the upper members of said articulations to draw the same along, fork-shaped upper ends of the upper members of the articulations and hubs of the fingers between the arms of said fork-shaped ends for preventing the lateral displacement of said articulations.

3. An improved hoeing machine as described and shown comprising in combination with the crank shaft, means for driving said crank shaft from the running wheels of the machine, hoeing tools, connecting rods one for each tool connecting said tool with the crank shaft, each connecting rod having a slit near its lower end, a shaft mounted in the machine frame, articulations composed of two or more articulated members for suspending the ends of the connecting rods to said shaft, downwardly projecting fingers fixed upon said shaft and gripping under the upper members of said articulations to draw the same along, fork-shaped upper ends of the upper members of the articulations and hubs of the fingers between the arms of said fork-shaped ends for preventing the lateral displacement of said articulations, fork-shaped lower ends of the lower members of said articulations, pivot bolts fixed in said fork-shaped ends, shoes to which said hoeing tools are fixed having each a slot by means of which the shoe is mounted upon the corresponding pivot pin, a shank of each shoe, an angularly bent end of said shank having a slit and a screw bolt traversing the slits of the connecting rod and the slit of the end of the shank of the shoe, substantially as described and shown and for the purpose set forth.

In testimony whereof I affix my signature in presence of two witnesses.

ROBERT WADENBACH.

Witnesses:
 CURT MÜLLER,
 ALFRED TALZWEDEL.